(12) United States Patent
Takahashi et al.

(10) Patent No.: US 9,650,052 B2
(45) Date of Patent: May 16, 2017

(54) DRIVING DIAGNOSIS METHOD AND DRIVING DIAGNOSIS APPARATUS

(71) Applicant: Hitachi, Ltd., Tokyo (JP)

(72) Inventors: Toshimitsu Takahashi, Tokyo (JP); Noboru Kiyama, Tokyo (JP); Tsuneo Sobue, Tokyo (JP); Tatsuaki Osafune, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/944,477

(22) Filed: Nov. 18, 2015

(65) Prior Publication Data
US 2016/0288797 A1 Oct. 6, 2016

(30) Foreign Application Priority Data
Apr. 3, 2015 (JP) .................. 2015-076437

(51) Int. Cl.
*B60W 40/09* (2012.01)
*B60W 40/08* (2012.01)
*B60K 35/00* (2006.01)

(52) U.S. Cl.
CPC ............. *B60W 40/09* (2013.01); *B60K 35/00* (2013.01); *B60W 40/08* (2013.01)

(58) Field of Classification Search
CPC ........ B60W 40/09; B60W 40/08; B60K 35/00
USPC ............................................. 701/1
See application file for complete search history.

(56) References Cited

U.S. PATENT DOCUMENTS

| 8,688,312 | B2* | 4/2014 | Kondoh ............... B60W 40/09 340/576 |
| 9,449,437 | B2* | 9/2016 | Izumi ............... G06F 17/30598 |
| 2014/0278574 | A1* | 9/2014 | Barber .................. B60W 40/09 705/4 |

FOREIGN PATENT DOCUMENTS

JP 2013-030188 A 2/2013

* cited by examiner

*Primary Examiner* — Yazan Soofi
(74) *Attorney, Agent, or Firm* — Mattingly & Malur, PC (57) ABSTRACT

A driving diagnosis method and driving diagnosis apparatus enable drivers to recognize where their own driving diagnosis result is located in the driving behavior distribution of a safe driver group and the driving behavior distribution of a dangerous driver group. The degree of a driver's dangerous driving behavior is set as a horizontal axis, the number of drivers according to the dangerous driving behavior degree is set as a vertical axis, and screen information including distributions of a safe driver group and a dangerous driver group as determined by using travel history information about the drivers stored in a storage unit, and a diagnosis result of the dangerous driving behavior of a diagnosis target driver is generated and output.

6 Claims, 9 Drawing Sheets

User Information

131

| 401 | 402 | 403 | 404 | 405 |
|---|---|---|---|---|
| User ID | Driving History | Accident History | Driving Skills | Annual Travel Distance |
| XXXX | 12 Years | 3 Times | Questionnaire Score: 70 Points Insurance Grade: Grade 17 | 10000km |
| : | : | : | : | : |

| 401 | 406 | 407 | 408 |
|---|---|---|---|
| User ID | Age | Sex | Vehicle Type |
| XXXX | 35 years old | Male | Minivan |
| : | : | : | : |

DRIVING DIAGNOSIS METHOD AND DRIVING DIAGNOSIS APPARATUS

CROSS-REFERENCES TO RELATED APPLICATIONS

This application relates to and claims priority from Japanese Patent Application No. 2015-076437, filed on Apr. 3, 2015, the entire disclosure of which is incorporated herein by reference.

BACKGROUND

Field of the Invention

The present invention relates to a driving diagnosis method and a driving diagnosis apparatus.

Description of Related Art

Conventionally, sensors mounted on a vehicle are used to perform a driving diagnosis to measure a driver's acceleration work, brake work, and steering wheel work, estimate and evaluate, for example, driving roughness and accident risks. Furthermore, the result of such a driving diagnosis is used to provide a service to give driving advices to drivers who have high accident risks, and a service to change insurance premiums of car insurances according to the drivers' driving level. Users can enjoy advantages of using these services such as reduction of an accident rate and low insurance premiums resulting from safe driving.

Regarding the driving diagnosis, there is a known vehicle driving support apparatus described in Japanese Patent Application Laid-Open (Kokai) Publication No. 2013-30188. This apparatus acquires short-term data indicative of a current travelling status and driving operation and medium-term data indicative of the travelling status and driving operation of the relevant day, respectively. Then, the apparatus performs the driving diagnosis by comparing distribution of the short-term data with distribution of the medium-term data and evaluates the driving diagnosis result according to two evaluation criteria.

SUMMARY

However, with the above-mentioned technique described in Japanese Patent Application Laid-Open (Kokai) Publication No. 2013-30188, a driver cannot recognize where their own driving diagnosis result is located in driving behavior distribution of a safe driver group and driving behavior distribution of a dangerous driver group, or cannot obtain a reliable driving diagnosis result.

Therefore, it is an object of the present invention to provide a driving diagnosis method and driving diagnosis apparatus which enable the driver to recognize where their own driving diagnosis result is located in the driving behavior distribution of the safe driver group and the driving behavior distribution of the dangerous driver group, and which can obtain a reliable driving diagnosis result.

A representative example of the present invention is described below. Specifically speaking, the present invention is characterized in that a computer is made to set the degree of a driver's dangerous driving behavior as a horizontal axis and the number of drivers according to the dangerous driving behavior degree as a vertical axis and generate and output screen information including distributions of a safe driver group and a dangerous driver group as determined by using travel history information about the drivers stored in a storage unit, and a diagnosis result of the dangerous driving behavior of a diagnosis target driver.

According to the present invention, the driver can recognize where their own driving diagnosis result is located in the driving behavior distribution of the safe driver group and the driving behavior distribution of the dangerous driver group, and can obtain a reliable driving diagnosis result.

DETAILED DESCRIPTION OF PREFERRED EMBODIMENTS

An embodiment of the present invention will be described below in detail with reference to the attached drawings.

Figure 1:
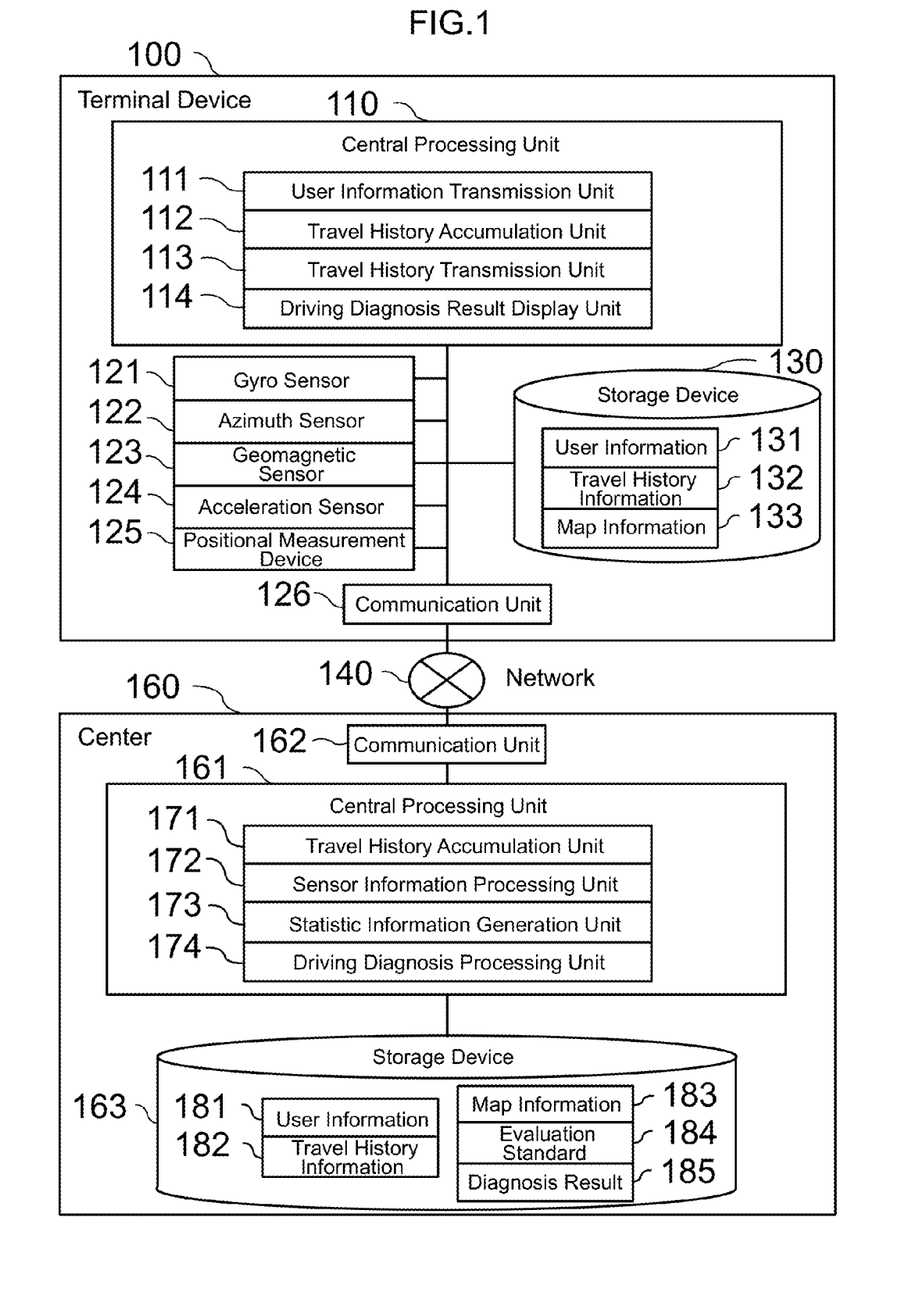
FIG. 1 is a diagram illustrating an overall configuration example of a system according to an embodiment of the present invention.

FIG. 1 is a diagram illustrating an overall configuration example of a system according to an embodiment of the present invention. The system according to the embodiment of the present invention is a computer system configured by connecting a plurality of terminal devices 100 and a telematics center 160 to a network 140.

Under this circumstance, the reference numeral 100 represents a terminal device for this system to acquire vehicle movement data. This terminal device can be implemented by a general computer and is equipped with a central processing unit 110, a gyro sensor 121, an azimuth sensor 122, a geomagnetic sensor 123, an acceleration sensor 124, a positional measurement device 125, a communication unit 126, and a storage device 130. The respective devices are connected via communication paths. Incidentally, as an embodiment of the present invention, it is possible to not include any of the gyro sensor 121, the azimuth sensor 122, the geomagnetic sensor 123, or the positional measurement device 125.

The central processing unit 110 is equipped with various necessary functions for this system. A user information transmission unit 111 is a function that transmits user information 131 stored in the storage device 130. This user information 131 is information for uniquely identifying a user who is a driver using the terminal device, and is configured of, for example, a user ID and driving experience.

Furthermore, a travel history accumulation unit 112 is a function that accumulates data, which are acquired by the gyro sensor 121, the azimuth sensor 122, the geomagnetic sensor 123, the acceleration sensor 124, and the positional measurement device 125, as travel history information 132. Specifically speaking, the gyro sensor 121 acquires a vehicle's turning angle speed. The azimuth sensor 122 acquires the azimuth of the terminal device 100. The geomagnetic sensor 123 acquires a direction in which the terminal device 100 faces by using geomagnetism. The acceleration sensor 124 acquires acceleration of three-axis directions of the terminal device 100 individually. Generally, a GPS (Global Positioning System) sensor is used as the positional measurement device 125, which acquires the latitude, longitude, and height of the terminal device 100. Information acquired from these sensors is accumulated as the travel history information 132 in the storage device 130 by the aforementioned travel history accumulation unit 112.

A travel history transmission unit 113 is a function that transmits the travel history information 132, which has been accumulated in the storage device 130, to the telematics center 160 via the communication unit 126 and the network 140.

Furthermore, the storage device 130 also accumulates map information 133 which is used to, for example, match the position of the vehicle with a traveling road.

A driving diagnosis result display unit 114 is a function that presents driving characteristics obtained by this system to the driver by a display method which is easily comprehensible for the driver.

The terminal device 100 can communicate with the telematics center 160 via the network 140. The aforementioned user information transmission unit 111 and travel history transmission unit 113 transmit data to the telematics center 160 via this network 140 and the driving diagnosis result display unit 114 receives, for example, the driving diagnosis result from the telematics center 160 via the network 140. Alternatively, as another preferred embodiment, the driving diagnosis result display unit 114 itself may diagnose the driving characteristics based on information accumulated in the storage device 130.

The telematics center 160 can be implemented by a general computer and is equipped with a central processing unit 161, a communication unit 162, and a storage device 163. The central processing unit 161 is connected to the communication unit 162 and the storage device 163 via communication paths.

The central processing unit 161 is provided with necessary functions for this system. A travel history accumulation unit 171 accumulates travel history, which has been received from the terminal device 100, as travel history information 182 in the storage device 163. Sensor information such as acceleration is included as part of the travel history information 182 and a sensor information processing unit 172 has a function that processes the sensor information. A statistic information generation unit 173 generates statistic information, which is necessary for the driving diagnosis, from the travel history information 182 and the map information 183 which are accumulated in the storage device 163. A driving diagnosis processing unit 174 performs the driving diagnosis based on the driver's driving behaviors, stores the diagnosis result in the storage device 163, and transmits the diagnosis to the terminal device 100 via the communication unit 162 and the network 100.

Furthermore, a user information 181 is also accumulated in the storage device 163 in order to authenticate the user who is the driver. Accordingly, when the user information is transmitted from the user information transmission unit 111 of the terminal device 100, the central processing unit 161 which receives the user information can solely identify the relevant user.

Furthermore, an evaluation criterion for diagnosing the driver's driving is stored in 184. This accumulates information with regard to the evaluation criterion determined by processing described later.

The driving diagnosis result of a diagnosis target driver is stored in 185. This accumulates information about each driver's diagnosis result which is calculated by processing described later.

The system illustrated in FIG. 1 is used for two major usages. One usage is to create the evaluation criterion 184 to perform the driving diagnosis. The other usage is to perform the driving diagnosis of another driver by using the acquired evaluation criterion 184.

Figure 2:
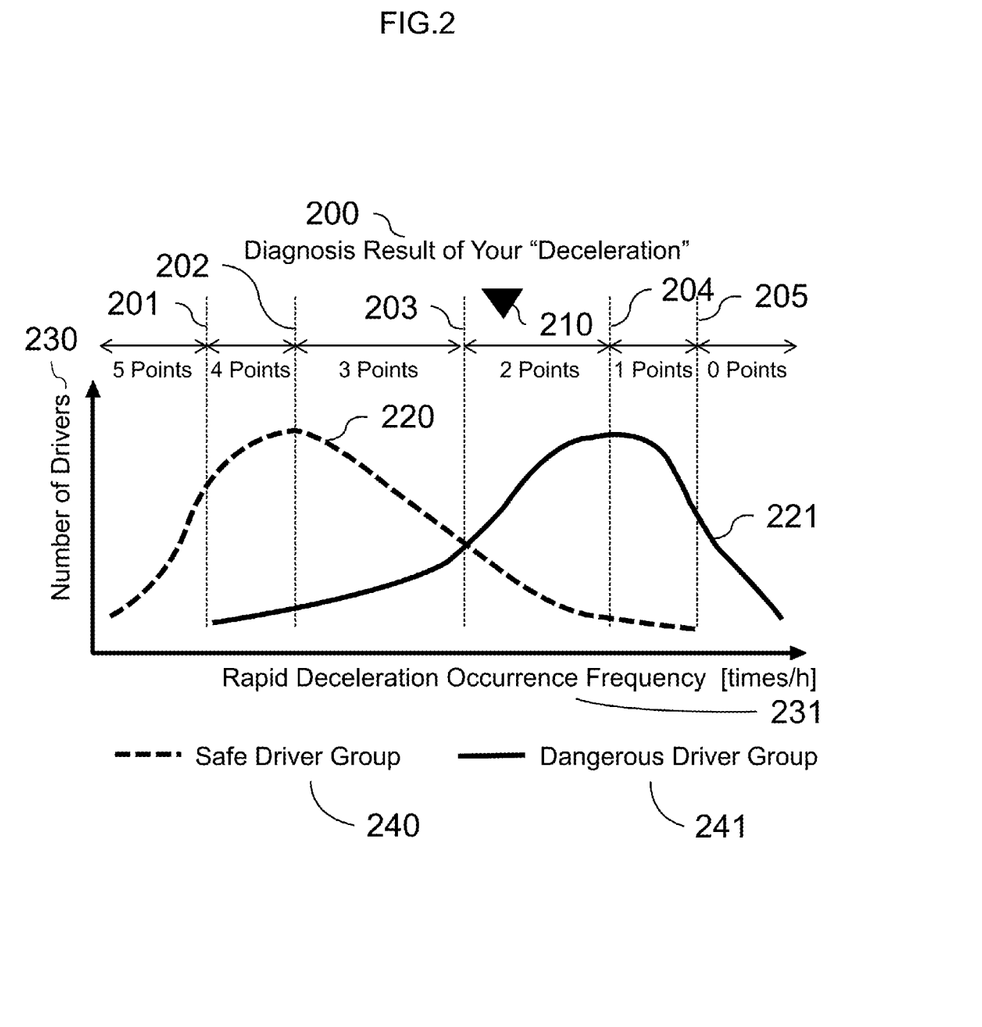
FIG. 2 is a diagram illustrating an example of a driving diagnosis result according to an embodiment of the present invention.

FIG. 2 is a diagram illustrating an example of the driving diagnosis result according to an embodiment of the present invention. FIG. 2 illustrates, as an example, the diagnosis result of a vehicle's deceleration and displays distribution for each driver as a graph by setting rapid deceleration occurrence frequency 231 as a horizontal axis and the number of drivers 230 as a vertical axis.

FIG. 2 illustrates distribution 220 of a safe driver group 240 and distribution 221 of a dangerous driver group 241 individually. The safe driver group 240 indicates, for example, a driver group which was determined to be safe driving drivers in advance on the basis of the drivers' accident record (the number of accidents) in the statistic information. Similarly, the dangerous driver group indicates, for example, a driver group which was determined to be dangerous driving drivers in advance on the basis of the drivers' accident record in the statistic information. Now, if the safe driver group is taken as an example, it can be seen from the rapid deceleration occurrence frequency that the distribution expands from drivers with low frequencies to drivers with high frequencies with respect to each individual driver, while you can tell that there is a difference in distribution tendency between the behavior distribution 220 of the safe driver group and the behavior distribution 221 of the dangerous driver group. Specifically speaking, it can be seen that a central value of the rapid deceleration occurrence frequency of the safe driver group tends to be lower than the rapid deceleration occurrence frequency of the dangerous driver group. Accordingly, it is possible to: recognize that a driver with a low rapid deceleration occurrence frequency is generally a safe driver; recognize where in the relevant distribution the diagnosis result 210 of the diagnosis target driver is located; and obtain a reliable driving diagnosis result.

Incidentally, regarding a method for presenting the driving diagnosis result to the driver as illustrated in FIG. 2, an example of a screen image presented to the driver when performing the driving diagnosis of the driver is shown. A score of the driving diagnosis result is determined on the basis of overlapping distributions. An intermediate point 203 where the distributions overlap with each other is set as the basis, a range from the intermediate point 204 to a central value 202 of the distribution 202 of the safe driver group is set as 3 points, and a range from the intermediate point 203 to a central value 204 of the dangerous driver group is set as 2 points. Furthermore, a range from the central value 202 of the safe driver group to a point 201 deviated by a standard deviation $\sigma_1$ of the distribution is set as 4 points and a range deviated by more than $\sigma_1$ is set as 5 points. Similarly, a range from the central value 204 of the dangerous driver group to a point 205 deviated by a standard deviation $\sigma_2$ of the distribution is set as 1 point and a range deviated by more than $\sigma_2$ is set as 0 point. Therefore, the widths of the scores differ depending on how the distributions overlap with each other. Furthermore, the content of an advice or whether the advice is made or not is changed depending on the score. Since the rapid deceleration occurrence frequency of the diagnosis target driver belongs to the section of 2 points in the example illustrated in FIG. 2, it means that the diagnosis target driver earns 2 points with respect to an diagnosis item of the rapid deceleration.

The content presented in this example may be changed as appropriate according to external factors such as the screen size and other display content. Specifically speaking, a case where score sections are divided into three sections of 1-3 points may be possible. In this case, the score sections may be divided based on an average $M_3$ between an average value $M_1$ of the safe drivers' distribution and an average value $M_2$ of the dangerous drivers' distribution. Furthermore, there is another possible method of sectioning the distributions on the basis of maximum values and minimum values of the safe drivers' and dangerous drivers' distributions.

Furthermore, besides the method of displaying the distributions by setting the number of drivers as the vertical axis, it is also possible to express the distributions by using, for example, color density according to the number of drivers. In this case, a plurality of diagnosis items may be further displayed together by setting the rapid acceleration occurrence frequency as the horizontal axis, setting rapid deceleration occurrence frequency in the vertical axis direction, and displaying the color density in the two-dimensional graph.

Figure 3:
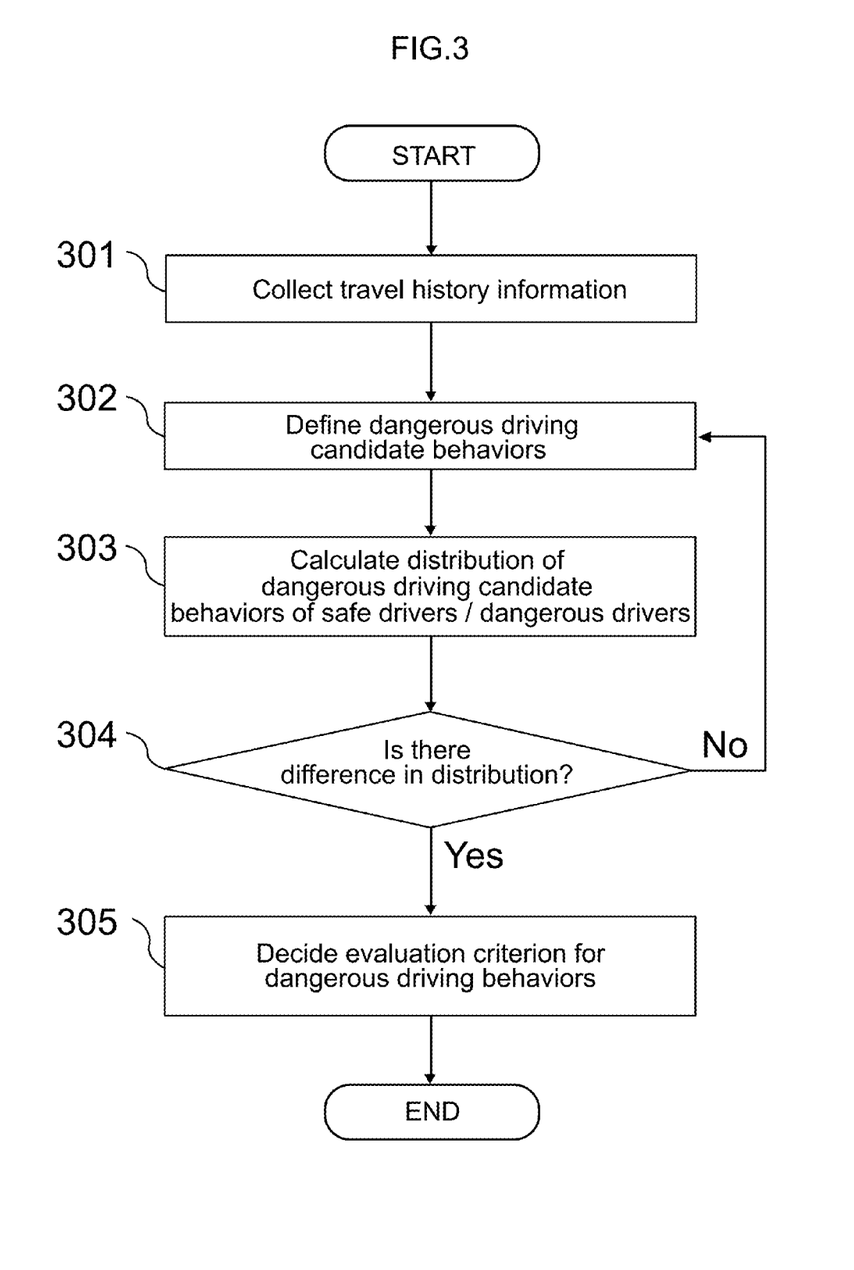
FIG. 3 is a processing flow chart for preparing an evaluation criterion 184 according to an embodiment of the present invention.

FIG. 3 is a processing flow chart for creating the evaluation criterion 184 according to an embodiment of the present invention.

The central processing unit 161 firstly collects the travel history information in step 301. This processing is to have the central processing unit 161 irregularly receive the travel history information 132 transmitted from the plurality of terminal devices 100 and store it in the travel history information 182 of the storage device 163. Since the terminal device 100 generally irregularly transmits the travel history information accumulated in its own storage device 130, the telematics center 160 irregularly collects this travel history information.

Next, the central processing unit 161 defines the driver's dangerous driving candidate behaviors in step 302. Examples of candidates for the dangerous driving behaviors include rapid deceleration, rapid acceleration, back-and-forth swaying, left-and-right swaying, sudden left turn, sudden right turn, an excessive speed, ignoring a stop sign, a failure to keep an inter-vehicle distance, and sudden lane changing. These dangerous driving behaviors are characterized by numerical values of the quantity, frequency, or degree of such behaviors. For example, in a case of the rapid deceleration frequency, it is necessary to specify an appropriate value by changing, for example, a threshold value of deceleration (negative acceleration) which is considered to be the rapid deceleration, and continuous elapsed time in excess of the threshold value when it is considered that the rapid deceleration has occurred.

In step 303, while changing that value, the central processing unit 161 calculates distributions of the dangerous driving candidate behaviors of a safe driver and a dangerous driver, respectively. This processing is actually repeatedly executed together with the next step 304 by the central processing unit 161 and the execution of the processing is repeated until it is acknowledged that there is a statistically significant difference between the distributions of the dangerous driving candidate behaviors of the safe driver and the dangerous driver, respectively. In the example of the rapid deceleration frequency, the central processing unit 161 repeatedly calculates the distributions by changing the threshold value of deceleration and a parameter for the continuous elapsed time in excess of the threshold value and repeats the processing until it can be acknowledged that there is a significant difference. Now, regarding statistic test methods, various test methods are possible to find, for example, a difference in an average value by a Welch t-test, a difference in a central value by a Brunner-Munzel test, and a difference in appearance frequency by a chi-square test. It is recommended to use these tests differently as appropriate depending on the defined dangerous driving behaviors or their distributions; however, it is also possible to verify the difference by performing only the Brunner-Munzel test which does not assume, for example, the shape of the distribution or homoscedastic property of the distribution. If the statistically significant difference is found in the distributions in step 304, the value set by the definition of the dangerous driving behaviors by the central processing unit 161 (step 302) is determined as an evaluation criterion for judging the dangerous driving behaviors in step 305. The determined evaluation criterion includes parameter information such as a threshold value recognized as optimum for a data processing method and the processing and such information is stored in the evaluation criterion 184 by the central processing unit 161. Incidentally, once this evaluation criterion is determined, it may not necessarily be fixed and may be reviewed regularly. Furthermore, this evaluation criterion may possibly be changed due to an external environment such as a local area and it is possible to set a different evaluation criterion for each external environment such as each local area.

The evaluation criterion for diagnosing the driver's driving can be determined by following this processing sequence. Regarding the processing of FIG. 3, it is necessary to perceive the driver's accident potential in advance in order to acquire this evaluation criterion and information about the relevant driver is indispensable. That information is stored as the user information 181 in the storage device 163.

Figure 4:
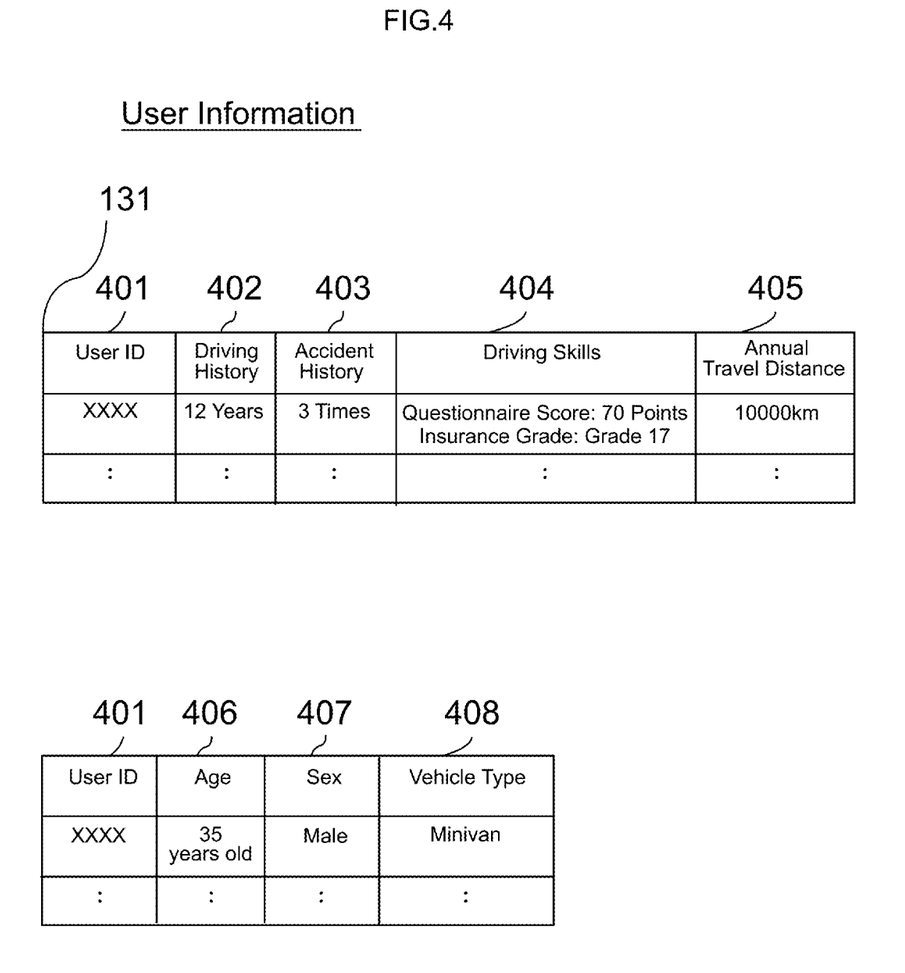
FIG. 4 is a diagram illustrating an example of user information 131 according to an embodiment of the present invention.

FIG. 4 is a diagram illustrating an example of the user information 131 according to an embodiment of the present invention. The user information 131 represents the driver's profile information such as the driver's age and sex, a vehicle type of a vehicle owned by the driver, annual travel distance, driving experience, and accident record.

401 is information for uniquely identifying a user who is the driver. In this example, XXXX is registered as a user ID.

402 is information indicative of the driver's driving experience. In this example, "12 years" is registered as the driving experience of the driver whose user ID is "XXXX"; and this information indicates that the driving experience of the driver whose user ID is "XXXX" is "12 years."

403 is information indicative of accident record. In this example, "3 times" is registered and this information indicates that the driver whose user ID is "XXXX" caused accidents three times in the past. The accident record can be registered by distinguishing accidents according to the scale of the accidents or distinguishing whether the relevant accident is an accident resulting in injury or death or an accident resulting in property damage.

404 is information indicative of driving skills. 404 stores various kinds of information indicative of the driving skills; and in this example, examples of a questionnaire score to determine the driving skills and an insurance grade of a car insurance are indicated and it is shown that the questionnaire score of the driver whose user ID is "XXXX" is 70 points and the insurance grade of the driver whose user ID is "XXXX" is grade 17. Regarding the driving skills, it may be possible to adopt scores calculated by applications or devices for testing, for example, cognitive ability such as dynamic visual acuity, judgment ability by, for example, memory and reflexes, and ability to perform appropriate operation.

405 is information indicative of an annual travel distance. In this example, the annual travel distance is registered as 10000 km and it is shown that the driver whose user ID is "XXXX" is a driver who travels about 10000 km annually. Regarding the annual travel distance, it is possible to record the travel distance on each road type such as the travel distance on expressways and the travel distance on national roads.

406 is information indicative of the driver's age. In this example, the driver's age is registered as 35 years old and it is shown that the driver whose user ID is "XXXX" is a 35-year-old driver.

407 is information indicative of the driver's sex. In this example, the driver's sex is registered as a male and it is shown that the driver whose user ID is "XXXX" is male.

408 is information indicative of a vehicle type. In this example, it is shown that the vehicle type of a vehicle owned by the driver whose user ID is "XXXX" is a minivan. Regarding classification of the vehicle type, for example, a method of recording a vehicle weight may also be possible.

The user information illustrated in FIG. 4 is necessary information to execute the processing illustrated in FIG. 3. This user information may be used solely or appropriately combined with another user information, so that users can be distinguished as a safe driving driver and a dangerous driving driver. For example, by using the accident record 403, a driver whose number of accidents is less than a threshold value can be considered as a safe driving driver and a driver whose number of accidents is more than the threshold value can be considered as a dangerous driving driver.

Figure 5:
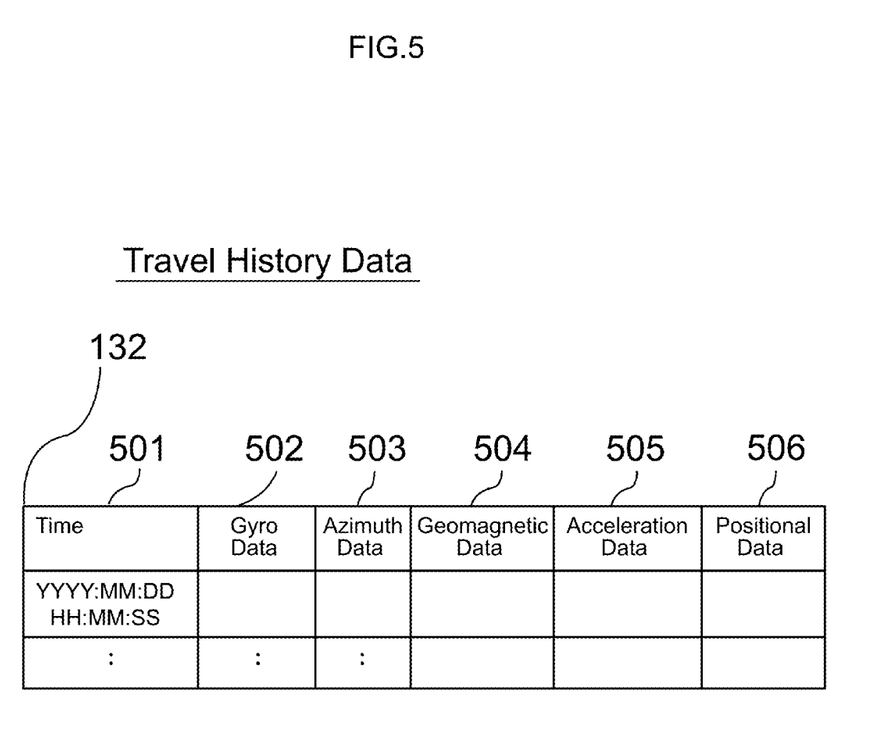
FIG. 5 is a diagram illustrating an example of travel history information 132 according to an embodiment of the present invention.

FIG. 5 is a diagram illustrating an example of the travel history information 132 according to an embodiment of the present invention. This travel history is managed for each user and chronological data are stored in this data. 501 is time when the data was acquired. 502 is gyro sensor data acquired by the terminal device 100. 503 is azimuth sensor data acquired by the terminal device 100. 504 is geomagnetic sensor data acquired by the terminal device 100. 505 is acceleration data acquired by the terminal device 100. 506 is positional data acquired by the terminal device 100.

Figure 6:
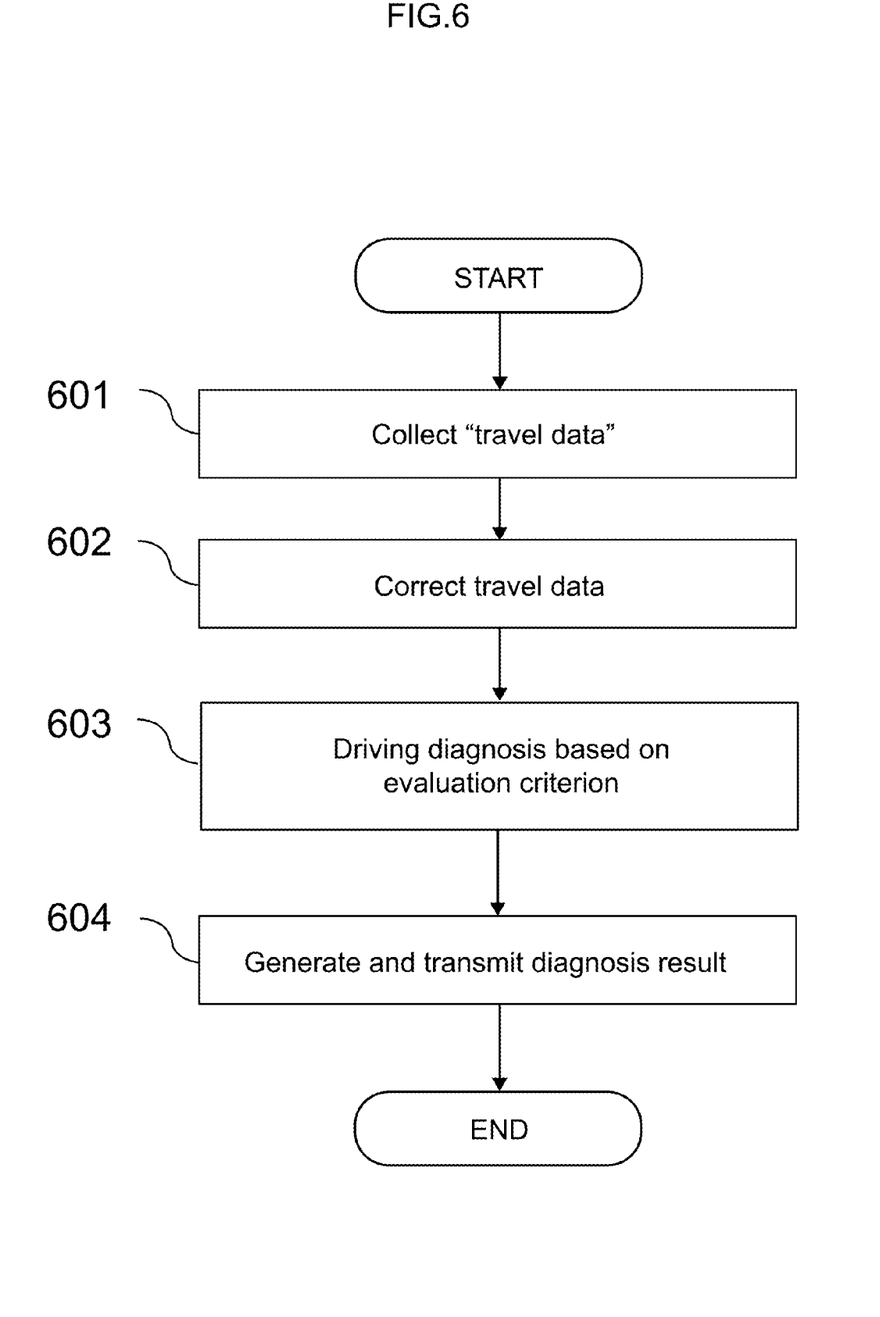
FIG. 6 is a processing flow chart for performing a driver's driving diagnosis according to an embodiment of the present invention.

The travel history information 132 illustrated in FIG. 5 is used for both the creation of the evaluation criterion and the driving diagnosis of the driver. When the evaluation criterion is to be created, the processing is executed according to the flow illustrated in FIG. 3. FIG. 6 illustrates an example in which the travel history information 132 is used for the driving diagnosis of the driver.

FIG. 6 is a processing flow chart for performing the driving diagnosis of the driver according to an embodiment of the present invention. Step 601 is processing executed by the central processing unit 161 to acquire travel data for a certain period of time from the travel history information 182. In this step 601, it is possible to arbitrarily set the period of data to be acquired and thereby set a diagnosis period. For example, the data period may be designated on a trip basis by setting a period from the start of driving to the end of driving as one trip or may be designated on a time basis such as a daily, weekly, or monthly basis. Furthermore, settings of a display period of the driving diagnosis result may be changed according to the driver's preference.

Step 602 is processing executed by the central processing unit 161 to correct the sensor information acquired by the terminal device 100. For example, the central processing unit 161 executes processing for converting the acceleration sensor information acquired by the terminal 100 into vertical and horizontal acceleration of the vehicle and noise removal processing. The acceleration sensor 124 of the terminal device 100 has a unique direction depending on how the terminal 100 is installed and how it is held and that direction does not necessarily match a travelling direction, horizontal direction, or vertical direction of the vehicle. Normalization processing for, for example, making the direction match it is necessary in order to use the same evaluation criterion to determine a plurality of vehicles. Also, output data from a plurality of sensor devices 121-125 generally include errors. Furthermore, the errors differ depending on the device type of the terminal device 100 and individual differences of the sensor devices. Processing of, for example, a low-pass filter on the chronological data is necessary in order to eliminate their differences and use the same evaluation criterion for determination. In step 602, the central processing unit 161 is made to execute, for example, such normalization processing and noise removal processing.

Step 603 is processing executed by the central processing unit 161 to perform the driving diagnosis of the diagnosis target driver with respect to each dangerous driving behavior by using the evaluation criterion 184 determined in FIG. 3. When performing the diagnosis of the rapid deceleration frequency, the central processing unit 161 executes the diagnosis using a threshold value and measurement time confirmed that the distribution statistically differs between safe drivers and dangerous drivers. For example, if it is statistically found that the distribution of the frequency when one-minute vertical acceleration of the vehicle becomes lower than a threshold value −2.0 m/s$^2$ differs between the safe drivers and the dangerous drivers, the central processing unit 161 calculates the frequency when the vertical acceleration of the vehicle becomes lower than the threshold value −2.0 m/s$^2$, every minute with respect to all sections of diagnosis target travel data of an evaluation target driver and calculates an average of such frequencies in step 603. Then, the central processing unit 161 calculates the score depending on which section in the graph illustrated in FIG. 2 the calculated rapid deceleration frequency is included. Furthermore, a method of considering the user information of the diagnosis target driver is possible as a score calculation method. For example, a statistical score may be calculated by combining the annual travel distance 405 and the age 406 with the rapid deceleration frequency. Furthermore, when the score is calculated in a plurality of combinations as the user information, it is also possible to use a machine learning method. For example, it is possible to use a Support Vector Machine to prepare a learning model by using the user information and the safe drivers' rapid deceleration frequency and the dangerous drivers' rapid deceleration frequency as training data, and then calculate accident potential with respect to the item of the rapid deceleration of the relevant driver on the basis of the diagnosis target driver's user information and the rapid deceleration frequency.

In a case of the rapid acceleration frequency similarly to the case of the rapid deceleration frequency, the central processing unit 161 calculates the rapid acceleration frequency and calculates the score. For example, if it is statistically found that the distribution of the frequency when one-minute vertical acceleration of the vehicle exceeds the threshold value $-2.0$ m/s$^2$ differs between the safe drivers and the dangerous drivers, the central processing unit 161 calculates the frequency when the vertical acceleration of the vehicle exceeds the threshold value $-2.0$ m/s$^2$, every minute with respect to all sections of diagnosis target travel data of the evaluation target driver and then calculates the score based on an average of such frequencies.

In a case of the degree of back-and-forth swaying, let us assume the following: as a result of having the central processing unit 161 calculate standard deviations of 30-second vertical acceleration of the vehicle during the entire diagnosis target period, it is found that the distribution statistically differs between the safe drivers and the dangerous drives with respect to an average of the standard deviations. In this case, upon the driving diagnosis as well, the central processing unit 161 calculates the standard deviations of 30-second vertical acceleration of the vehicle during the entire diagnosis target period and then calculates the score based on an average of such standard deviations.

In a case of the degree of left-and-right swaying, let us assume the following: as a result of having the central processing unit 161 calculate standard deviations of 30-second horizontal acceleration of the vehicle during the entire diagnosis target period, it is found that the distribution statistically differs between the safe drivers and the dangerous drives with respect to an average of the standard deviations. In this case, upon the driving diagnosis as well, the central processing unit 161 calculates the standard deviations of 30-second horizontal acceleration of the vehicle during the entire diagnosis target period and then calculates the score based on an average of such standard deviations.

In a case of the sudden left turn frequency, let us assume the following: as a result of having the central processing unit 161 determine a case where the azimuth data 503 has changed by $-30$ degrees or more within 10 seconds to be a left turn (when the azimuth changes in a positive direction is determined to be the left turn, a change of 30 degrees or more is determined to be the left turn), it is found that the distribution statistically differs between the safe drivers and the dangerous drivers with respect to the frequency when the horizontal acceleration of the vehicle exceeds a threshold value $-2.5$ m/s$^2$ (2.5 m/s$^2$ when a change in the positive direction is determined to be the left turn) among the number of times of all left turns during the diagnosis target period. In this case, upon the driving diagnosis as well, the central processing unit 161 calculates the score based on the frequency when the horizontal acceleration of the vehicle exceeds the threshold value $-2.5$ m/s$^2$ among the number of times of all left turns where the azimuth data 503 has changed by $-30$ degrees or more within 10 seconds.

In a case of the sudden right turn frequency similarly to the case of the sudden left turn, let us assume the following: as a result of having the central processing unit 161 determine a case where the azimuth data 503 has changed by 30 degrees or more within 10 seconds to be a right turn (when the azimuth has changed in a negative direction is determined to be the right turn, a change of $-30$ degrees or more is determined to be the right turn), it is found that the distribution statistically differs between the safe drivers and the dangerous drivers with respect to the frequency when the horizontal acceleration of the vehicle exceeds $-2.5$ m/s$^2$ (2.5 m/s$^2$ when a change in the negative direction is determined to be the right turn) among the number of times of all right turns during the diagnosis target period. In this case, upon the driving diagnosis as well, the central processing unit 161 calculates the score based on the frequency when the horizontal acceleration of the vehicle exceeds the threshold value 2.5 m/s$^2$ among the number of times of all right turns where the azimuth data 503 has changed by 30 degrees or more within 10 seconds.

Incidentally, other methods such as judgment based on the positional data 506 and the gyro data 502 may also be possible as conditions to determine the right or left turn.

In a case of the excessive speed, let us assume that it is found that the distribution statistically differs between the safe drivers and the dangerous drivers with respect to the frequency when an average overspeed in 10 seconds exceeds a threshold value 5 km/s$^2$ with respect to a limited speed acquired based on the positional information by the central processing unit 161. In this case, upon the driving diagnosis as well, the central processing unit 161 calculates the score based on the frequency when the average overspeed in 10 seconds exceeds the threshold value 5 km/s$^2$.

In case of ignoring a stop sign, let us assume that it is found that the distribution statistically differs between the safe drivers and the dangerous drivers with respect to a rate of passing through a position where the vehicle should temporarily stop without stopping on the basis of the positional information and acceleration information of the vehicle. In this case, upon the driving diagnosis as well, the central processing unit 161 calculates the score based on the rate of passing through the position where the vehicle should temporarily stop without stopping.

In a case of the failure to keep the inter-vehicle distance, let us assume that it is found that the distribution statistically differs between the safe drivers and the dangerous drivers with respect to frequency when the distance between cars, which is estimated based on the acceleration information by the central processing unit 161, exceeds 70% of a speed calculated based on the positional information of the vehicle. In this case, upon the driving diagnosis as well, the central processing unit 161 calculates the score based on the frequency when the distance between cars exceeds 70% of the speed.

In a case of the sudden lane change, let us assume that it is found that the distribution statistically differs between the safe drivers and the dangerous drivers with respect to lane changing frequency in 10 minutes based on the positional information. In this case, upon the driving diagnosis as well, the central processing unit 161 calculates the score based on the lane changing frequency in 10 minutes.

Step 604 is processing executed by the central processing unit 161 to generate a driving diagnosis result (screen image) to be presented to the driver and transmit the generated screen to the terminal device 100 via the network 140. Specifically speaking, based on the diagnosis result obtained by the central processing unit 161 in step 603, the driver's dangerous driving behavior degree is set as the horizontal axis and the number of drivers according to the dangerous driving behavior degree is set as the vertical axis, a driving diagnosis result including the above-described distributions of the safe driver group and the dangerous driver group, which were determined in advance, and the diagnosis result of the diagnosis target driver is generated;

screen information including the generated driving diagnosis result is generated; and this screen information is transmitted to the terminal device 100 via the network 140. Step 604 is processing for presenting it to the driver when the central processing unit 161 terminates the driving diagnosis in step 603. Alternatively, after the central processing unit 161 terminates the driving diagnosis in step 603, the terminal device 100 may perform diagnosis result display operation when the driver wishes to view the driving diagnosis; and in response to that operation, the central processing unit 161 may execute the diagnosis result notification processing (step 604).

As a result of steps 601, 602, 603, and 604, the screen image illustrated in FIG. 2 will be obtained based on the driver's travel history information 182 in accordance with the evaluation criterion 184.

An embodiment of the present invention has been explained. According to the above-described embodiment, the driver can recognize where their own driving diagnosis result is located in the driving behavior distribution of the safe driver group and the driving behavior distribution of the dangerous driver group, and can obtain a reliable driving diagnosis result.

Incidentally, the present invention is not limited to the above-described embodiment and includes many variations.

Figure 7:
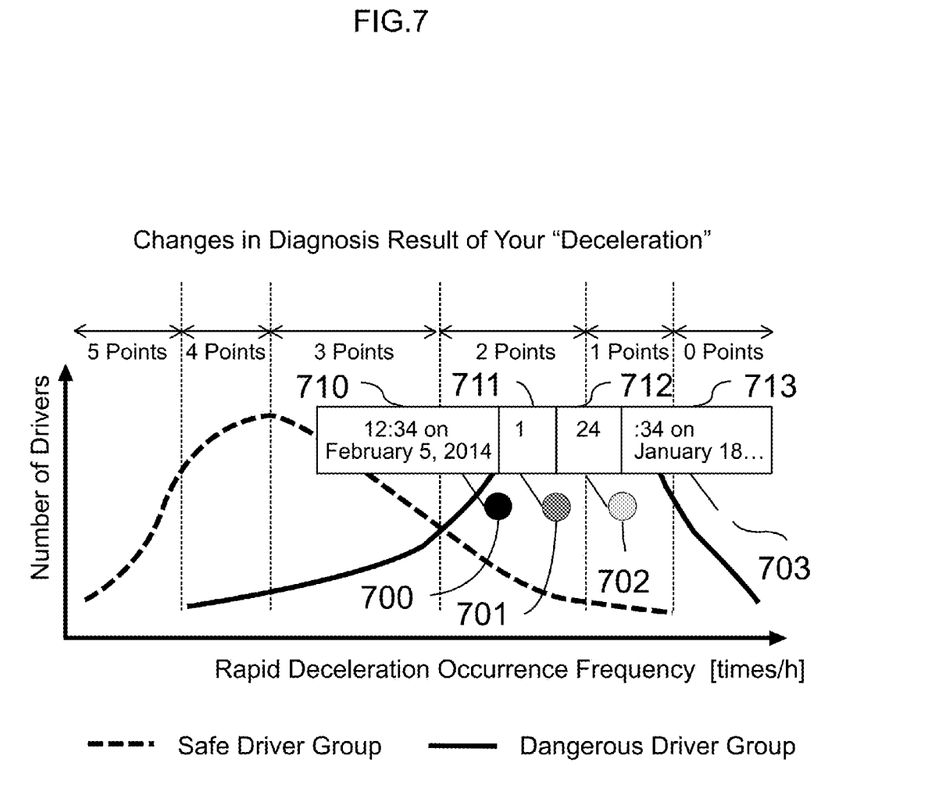
FIG. 7 is a diagram illustrating a variation of a driving diagnosis result according to an embodiment of the present invention.

FIG. 7 is a diagram illustrating a variation of the driving diagnosis result according to an embodiment of the present invention. In an example illustrated in FIG. 7, the driver's dangerous driving behavior degree is set as the horizontal axis and the number of drivers according to the dangerous driving behavior degree is set as the vertical axis, and the diagnosis result is displayed as a plurality of points 700-703 in a chronological order according to the rapid deceleration occurrence frequency of the diagnosis target driver in the aforementioned distributions of the safe driver group and the dangerous driver group, which were determined in advance. Accordingly, changes in driving characteristics in the chronological order can be recognized by displaying the date and time 710-713 at each point. As a result, not only the driver can recognize the changes in the driving techniques, but also any peculiar point can be easily found in the changes in the driving techniques; and by investigating its causes, the driver can recognize what would cause their driving to become better or worse.

Figure 8:
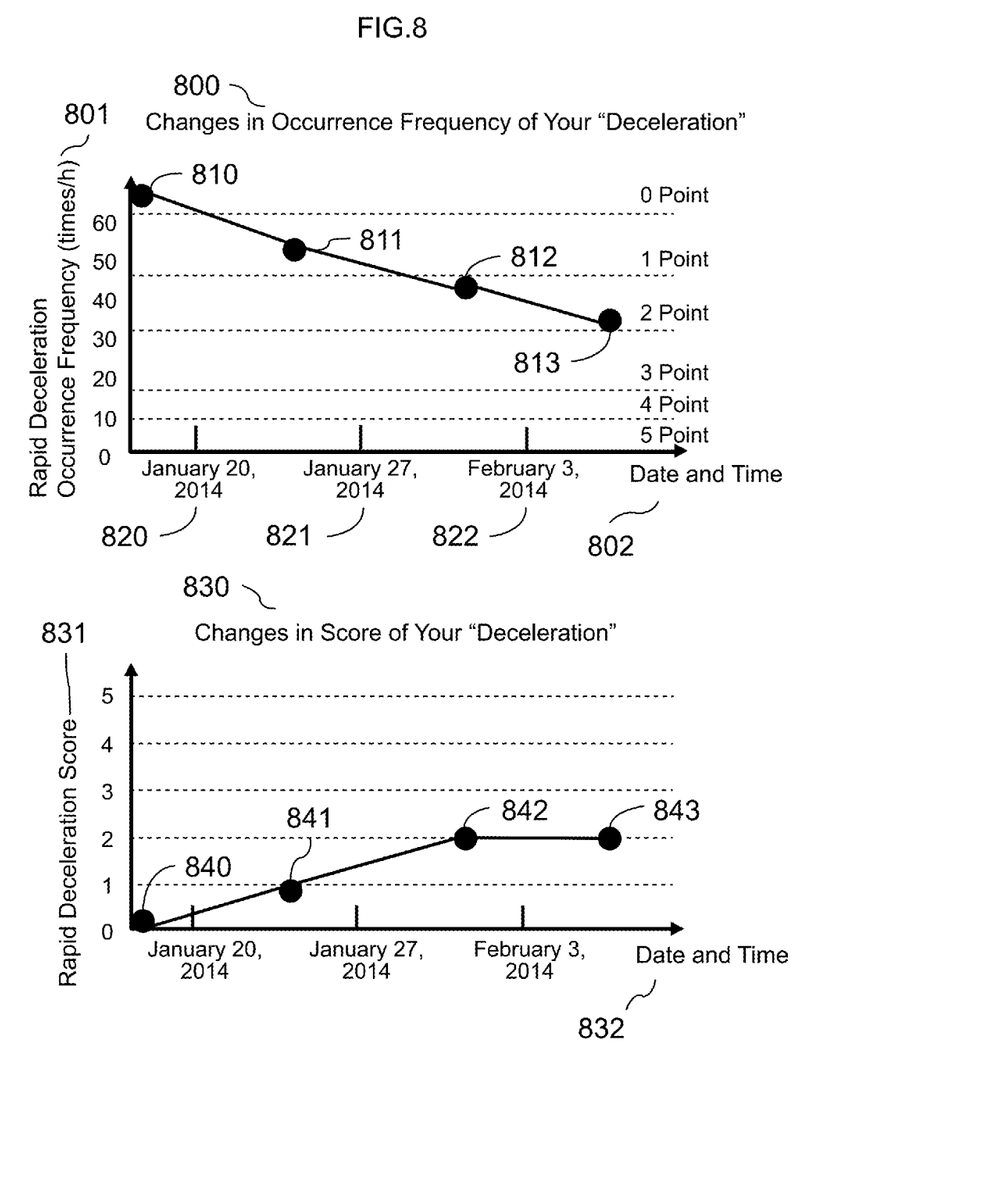
FIG. 8 is diagrams illustrating variations of a driving diagnosis result according to an embodiment of the present invention.

FIG. 8 illustrates variations of the driving diagnosis result according to an embodiment of the present invention. In examples illustrated in FIG. 8, an upper graph indicates changes 800 in the deceleration occurrence frequency and the score, where the vertical axis represents rapid deceleration occurrence frequency 801 and the horizontal axis represents a date and time 802. Referring to this graph, it is possible to recognize travel dates and times 820-822 and changes 810-813 in the deceleration occurrence frequency. With a lower graph in FIG. 8, changes in a score 831 of a deceleration item can be recognized in the chronological order. It is a method for presenting the driving diagnosis result according to the present invention and an example to display the diagnosis result of each diagnosis item together and display a total score, points of bad diagnosis result items, and a driving advice.

Figure 9:
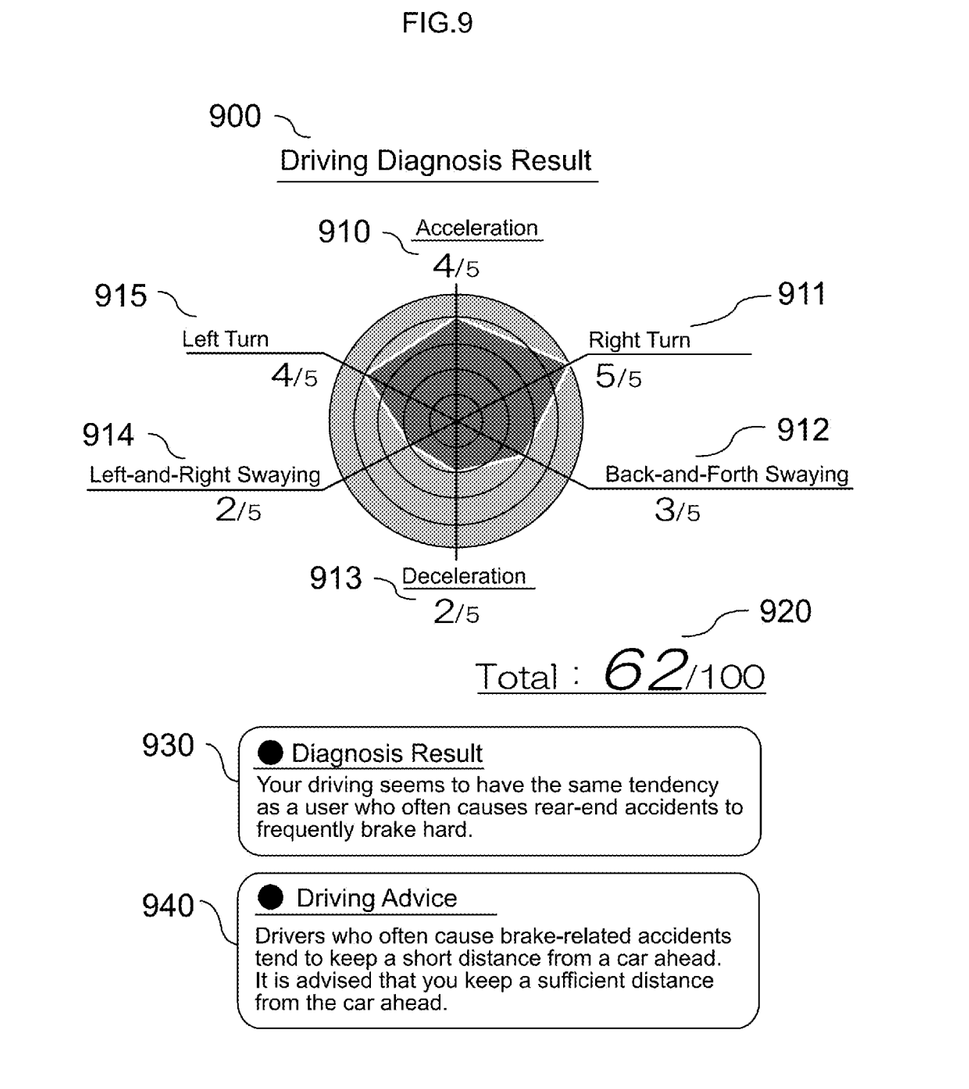
FIG. 9 is a diagram illustrating a variation of a driving diagnosis result according to an embodiment of the present invention.

FIG. 9 is a diagram illustrating a variation of the driving diagnosis result according to an embodiment of the present invention. An example of FIG. 9 displays the driver's rapid acceleration frequency 910, sudden right turn frequency 911, back-and-forth swaying rate 912, rapid deceleration frequency 913, left-and-right swaying rate 914, sudden left turn frequency 915, a driving diagnosis result of each item, a total driving diagnosis result based on these items, and a driving advice. Furthermore, a total score 920 is calculated from each item and is displayed. Now, the total score can be also calculated in step 603. Regarding a score calculation method, a possible method would be to calculate the score from the total score of each item. Furthermore, accident potential may be calculated by using the scores 910-915 of the respective items and the user information 181 as input data by means of, for example, a machine learning technique and a score corresponding to the accident potential may be displayed. Furthermore, for example, another possible method would be to calculate statistic accident potential from the scores 910-915 of the respective items and the user information 181 and display a score corresponding to that accident potential. Incidentally, the user information 181 does not always have to be used to calculate the total score.

FIG. 9 further displays a diagnosis result point 930. The diagnosis result point 930 explains characteristics of bad diagnosis result items from the viewpoint of similarity between the driving behavior distribution of the safe driver group and the driving behavior distribution of the dangerous driver group. In the example of FIG. 9, the bad diagnosis result items are the rapid deceleration frequency 913 and the left-and-right swaying rate 914; however, items more similar to the driving behavior distribution of the dangerous driver group are explained. Incidentally, the diagnosis results are accumulated as behavior similarity; and as a result of accumulating the diagnosis results, feature quantities such as average values and dispersion of possible behaviors are compared. Alternatively, another possible method would be to, for example, display an advice whose diagnosis result is closer to a central value of the driving behavior distribution of the dangerous driver.

FIG. 9 further displays a driving advice 940 obtained from the diagnosis result. The driving advice 940 presents a driving improvement method with respect to the diagnosis result point 930. Accordingly, it is possible to recognize how the driver should improve their driving.

Furthermore, the aforementioned embodiments have been described in detail in order to explain the invention in an easily comprehensible manner and are not necessarily limited to those having all the configurations explained above. Furthermore, regarding part of the configuration of a certain embodiment, the configuration of another embodiment can be added, deleted, or replaced. For example, a configuration to use a terminal such as a smart phone solely as the terminal device 100 is possible. In this case, the respective functions of the sensor information processing unit 172, the statistic information generation unit 173, and the driving diagnosis processing unit 174 of the central processing unit 161 for the center 160 are made to be the functions of the central processing unit 110 for the terminal device 100 and the evaluation criterion 184 and the diagnosis result 185 retained in the center 160 are retained in the terminal device 100.

Furthermore, for example, drivers may be divided into a plurality of groups such as safe drivers, dangerous drivers, and normal drivers, according to the drivers' profile information on the basis of the amount of driver's accident record, if the number of accidents is large or small, the driving experience, and the driving skills; the statistic information may be generated from the travel history information transmitted from the terminals of the drivers belonging to each group; a histogram may be generated for each of the extracted two groups with respect to the generated statistic information; whether there is any significant difference between their distributions may be checked by statistically testing the distributions; and the driving characteristics may be diagnosed from a certain driver's travel data by using the statistic information with the significant difference between the distributions. In this case, the driving experience 402 and the accident record 403 are combined and they are divided into a plurality of groups on the basis of a value obtained by dividing the number of accidents by the driving experience. Furthermore, the distributions of the plurality of groups such as the safe drivers, the dangerous drivers, and the normal drivers may be displayed together in the diagnosis result illustrated in FIG. 2 and FIG. 7.

Furthermore, in the aforementioned embodiment, whether the safe driver or the dangerous driver is determined based on the accident record; however, the driving experience and the accident record may be combined together, and a driver for whom the value obtained by dividing the number of accidents by the driving experience is lower than a threshold value may be determined to be the safe driver, and a driver for whom the value obtained by dividing the number of accidents by the driving experience is higher than the threshold value may be determined to be the dangerous driver.

Furthermore, in the aforementioned embodiment, whether the safe driver or the dangerous driver is determined based on the accident record; however, whether the safe driver or the dangerous driver may be determined based on the height of the questionnaire score by using the driving skills 404, or whether the safe driver or the dangerous driver may be determined based on the height of the insurance grade. Furthermore, regarding the threshold value used to determine whether the safe driver or the dangerous driver, a common threshold value for all drivers may be used or the threshold value may be changed as appropriate depending on, for example, the driving experience, age, sex, or vehicle type.

Furthermore, each function, etc. of the terminal device 100 and the center 160 may be implemented by hardware by, for example, designing part of or the whole of the function as an integrated circuit.

REFERENCE SIGNS LIST 100 terminal device
110 central processing unit
111 user information transmission unit
112 travel history accumulation unit
113 travel history transmission unit
114 driving diagnosis result display unit
121 gyro sensor
122 azimuth sensor
123 geomagnetic sensor
124 acceleration sensor
125 positional measurement device
126 communication unit
130 storage device
131 user information
132 travel history information
133 map information
140 network
160 telematics center
161 central processing unit
162 communication unit
163 storage device
171 travel history accumulation unit
172 sensor information processing unit
173 statistic information generation unit
174 driving diagnosis processing unit
181 user information
182 travel history information
183 map information
184 evaluation criterion
185 diagnosis result

What is claimed is:

1. A driving diagnosis method executed by a central processing unit of a server, the server comprising: a communication unit coupled to the central processing unit; and a storage device coupled to the central processing unit, wherein the communication unit is communicably coupled to respective communication units of a plurality of terminal devices, which are disposed in respective automobiles, each terminal comprising: a central processing unit; and a memory coupled to the central processing unit; and a plurality of sensors, wherein each terminal is associated with a driver, the method comprising:

receiving and storing, by the server, travel history information transmitted from the plurality of the terminal devices that includes time information of the travel history information and data of the plurality of sensors corresponding to the time information;

storing data for each of the plurality of terminals, by the server, that indicates whether a driver associated with each terminal is in a first group or in a second group;

for each of a plurality of driving actions, determining, by the server, a numerical value that results in a statistically significant difference between the distribution of the first group of drivers and the distribution of the second group of drivers based on the stored data for each of the plurality of terminals and the travel history information transmitted from each of the plurality of terminals for a statistical test method;

acquiring, by the server, travel data for a predetermined period of time from the travel history information for a driver;

determining, by the server, a score for the driver for each of the plurality of the driving actions based on the acquired travel data for the predetermined period of time and the numerical value for each of the driving actions; and generating an output screen on a display of a terminal of the score for each of the plurality of driving actions, the display including a distribution of the first group and the second group.

2. The driving diagnosis method according to claim 1, further comprising the steps of:
displaying, by the server the plurality of the scores for each of the plurality of driving actions in a chronological order.

3. The driving diagnosis method according to claim 1, wherein the plurality of sensors include at least one of a gyro sensor, an azimuth sensor, a geomagnetic sensor, an acceleration sensor, and a global positioning sensor.

4. A driving diagnosis system comprising:
a server comprising:
a storage unit for storing travel history information of drivers; and
a processor unit, and
a communication unit coupled to the processor unit;
a plurality of terminals respectively disposed in automobiles, each terminal comprising:
a central processing unit;
a memory coupled to the central processing unit; and a plurality of sensors, wherein each terminal is associated with a driver, wherein the processor unit is programmed to:
receive and store travel history information transmitted from the plurality of the terminal devices that includes time information of the travel history information and data of the plurality of sensors corresponding to the time information;
store data for each of the plurality of terminals that indicates whether a driver associated with each terminal is in a first group or in a second group;
for each of a plurality of driving actions, determine a numerical value that results in a statistically significant difference between the distribution of the first group of drivers and the distribution of the second group of drivers based on the stored data for each of the plurality of terminals and the travel history information transmitted from each of the plurality of terminals for a statistical test method;
acquire travel data for a predetermined period of time from the travel history information for a driver;
determine a score for the driver for each of the plurality of the driving actions based on the acquired travel data for the predetermined period of time and the numerical value for each of the driving actions; and
generate an output screen on a display of a terminal of the score for each of the plurality of driving actions, the display including a distribution of the first group and a second group.

5. The driving diagnosis apparatus according to claim 4, wherein the processor unit is further programmed to display the plurality of scores for each of the plurality of driving actions in a chronological order in the distribution.

6. The driving diagnosis system according to claim 4, wherein the plurality of sensors include at least one of a gyro sensor, an azimuth sensor, a geomagnetic sensor, an acceleration sensor, and a global positioning sensor.

* * * * *